Feb. 27, 1962   F. F. KIRCHNER   3,023,358
CONTROL SYSTEMS
Filed Dec. 12, 1955
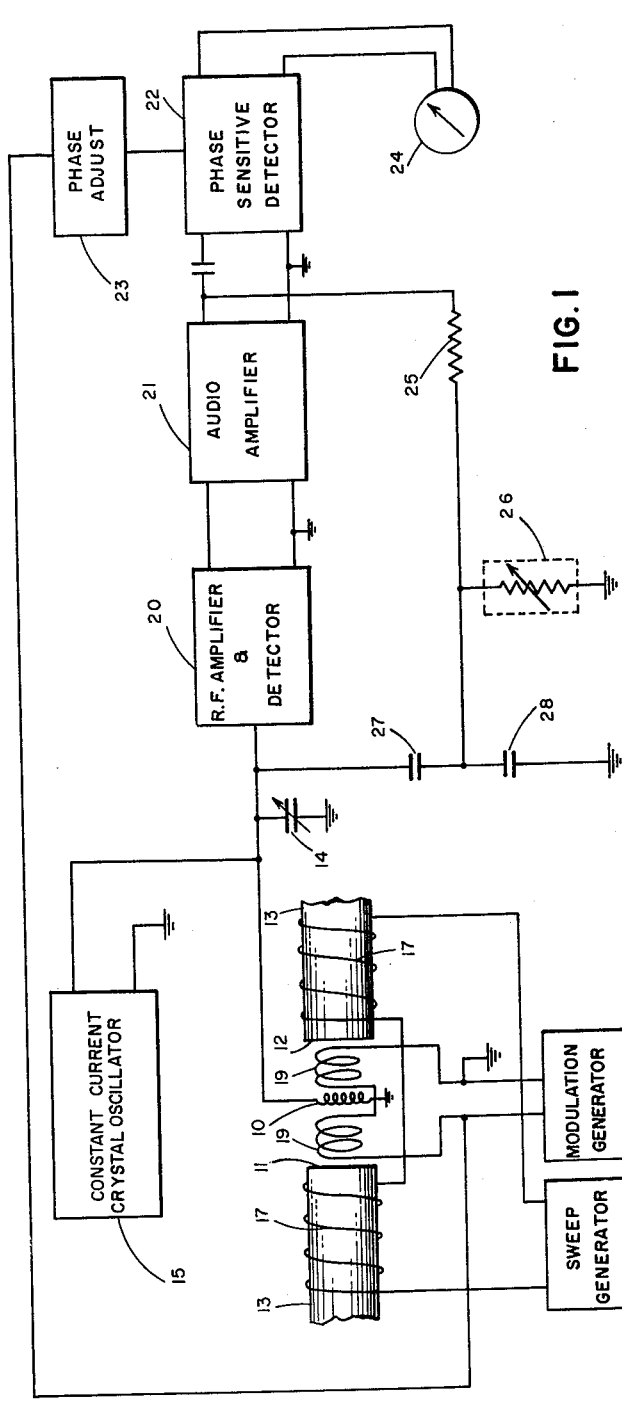
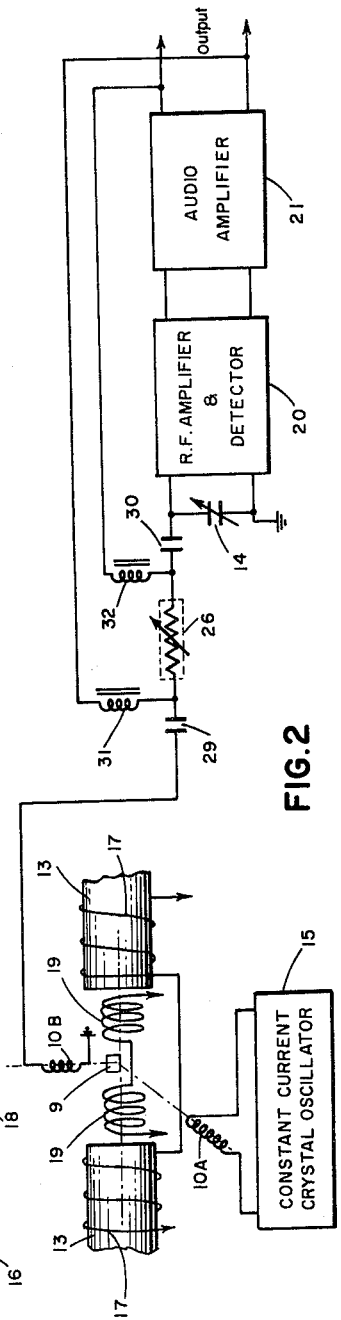
INVENTOR.
FRANCOIS F. KIRCHNER.
BY
HIS ATTORNEY.

United States Patent Office 3,023,358
Patented Feb. 27, 1962

3,023,358
CONTROL SYSTEMS
Francois F. Kirchner, Ridgefield, Conn., assignor, by mesne assignments, to Schlumberger Well Surveying Corporation, Houston, Tex., a corporation of Texas
Filed Dec. 12, 1955, Ser. No. 552,401
13 Claims. (Cl. 324—.5)

The present invention relates to control systems, and more particularly to new and improved apparatus utilizing feedback techniques for controlling electrical circuits, which are particularly useful for the control of equipment utilized in measuring nuclear and other paramagnetic resonance phenomena.

In many electrical systems weak signals to be measured or detected occur in the form of a small amplitude variation of a relatively large carrier. For example, in nuclear and electron paramagnetic resonance measuring equipment, the resonance signals generally appear as small variations in amplitude of a relatively large radio frequency signal. In order to measure such small variations, the radio frequency signal must be amplified many times and then the variations acurately detected. However, it is apparent that variations in the gain of the amplifying and detecting apparatus will cause erroneous measurements to be obtained.

In magnetic resonance equipment, one way of correcting for these errors is to periodically insert a calibrating signal into the system in order to check the gain. However, such a calibration does not lend itself to industrial applications, nor does it take fully into account variations which may occur during the resonance measurement. In systems where the resonance signal appears as a low frequency amplitude modulation of the R.F. signal, feedback arrangements have been utilized in which the detected D.C. signal is utilized to control the amplitude of the modulation whereby the modulation of the R.F. signal at said low frequency is maintained substantially constant. However, such arrangements are extremely sensitive to phase variations and additionally do not compensate for absolute variations in the R.F. level or for variations in the harmonics of said low frequency modulation.

Accordingly, it is a primary object of the present invention to provide new and improved control systems utilizing feedback which are extremely simple and reliable.

Another object of the present invention is to provide new and improved control systems which are particularly useful in nuclear and other paramagnetic resonance equipment where accurate measurements of small amplitude variations in a large carrier signal are desired.

A further object of the present invention is to provide new and improved feedback control systems by means of which nuclear and other paramagnetic resonance equipment may be made relatively insensitive to variations in gain at all significant frequencies.

These and other objects of the present invention are attained by providing between the output and input of amplifying and detecting means a negative feedback circuit which includes an electrical resistor element coupled to said input, the resistance of which varies as a function of the current passing therethrough or the voltage thereacross. The amplitude variations in the input signal which are detected by the amplifying and detecting means are utilized in the feedback circuit to control the current passing through, or the voltage across, the resistor element such that the signal level at the input is maintained substantially constant. Thus the variations in signal amplitude may be accurately measured regardless of the variations in gain of the amplifying and detecting means by measuring the current or voltage required by the variable resistance element to provide substantial cancellation of the variations in signal amplitude at said input.

In connection with nuclear and other paramagnetic resonance measuring equipment, the variable resistance element is coupled into the circuit containing the detecting coil across which appears a relatively large R.F. signal with a small amplitude modulation which results from magnetic resonance in a paramagnetic sample in the vicinity of the detecting coil. The voltage across the coil is amplified and detected and the detected signal utilized in the negative feedback circuit to control the variable resistance element. In this way the R.F. voltage across the coil is maintained substantially constant, and measurement of the resistance control voltage very accurately and simply gives an indication of the resonance signal.

The invention will be more fully understood with reference to the accompanying drawings in which:

FIG. 1 represents typical magnetic resonance equipment incorporating one form of the invention; and FIG. 2 represents another type of magnetic resonance equipment incorporating a second form of the present invention.

The following description of representative embodiments of the invention is given in connection with nuclear magnetic resonance equipment. It will, of course, be understood that the present invention finds many applications where negative feedback control systems may advantageously be employed to maintain an input signal level substantially constant. In FIG. 1 there is shown a magnetic resonance absorption spectrometer which may be of the type described in copending application Serial No. 552,403, filed December 12, 1955, by Kirchner and Jimerson for "Magnetic Resonance Apparatus." A radio frequency coil 10 into which a sample to be tested may be passed is disposed perpendicularly between the pole faces 11 and 12 of a permanent magnet 13. Coil 10 is connected in parallel with a tuning capacitor 14, and this parallel circuit is adapted to receive constant amplitude radio frequency current from a crystal controlled oscilator 15. The unidirectional magnetic field from magnet 13 between pole faces 11 and 12 is adapted to be swept slowly through the field intensity corresponding to magnetic resonance in the paramagnetic sample under investigation at the frequency at which coil 10 is energized, as a result of the current generated by sweep generator 16 and passing through coil 17 wound on magnet 13.

The unidirectional field is additionally modulated at a low frequency by current from modulation generator 18 passing through coil 19 which is parallel to the unidirectional field between pole faces 11 and 12. This modulation of the field modulates the amplitude of the resonance signal in the form of a small amplitude modulation on the large R.F. signal in coil 10, and it is the variations in the modulation amplitude which it is desired to detect. To this end the R.F. voltage across coil 10 is amplified and detected by R.F. amplifier and detector 20, and the detected signal, which is varying at the frequency of modulation generator 18 is applied to a broad band audio amplifier 21 and thence to phase sensitive detector 22, which receives a sensitizing or reference signal from generator 18 via phase adjuster 23. The D.C. output of detector 22 is applied to meter 24 which preferably makes a continuous record as a function of time. As is well-known, the recorded curve will be the derivative of the absorption curve for the sample under investigation. For a more detailed explanation of magnetic resonance absorption phenomenon, reference may be had to the literature, for example to an article by Bloembergen, Purcell, and Pound entitled "Relaxation Effects in Nuclear Magnetic Resonance Absorption," Physical Review, vol. 73, pages 679–712 (1948), or to an article entitled "Fundamentals of Nuclear Magnetic Resonance Absorption,"

Nos. I and II, by G. E. Pake, American Journal of Physics, vol. 18, pages 438–452 and pages 473–486 (1940).

In order that the system will be substantially insensitive to variations in the gain of amplifier-detector 20 and amplifier 21, the audio output of amplifier 21 which is substantially 180° out of phase with the corresponding audio modulation on the R.F. signal input to amplifier 20, is fed back, along with a D.C. biasing current and the harmonics of the modulation, through the decoupling resistor 25 across a resistor element 26, the resistance of which varies directly with audio variations in the current passing therethrough. Resistor element 26 is coupled into parallel with the circuit comprising coil 10 and capacitor 14 by means of series capacitors 27 and 28.

When resistor element 26 is connected as described above, its resistance varies inversely with the potential of the R.F. signal input to amplifier 20. Thus, as the R.F. signal tends to increase, the current through resistor element 26 tends to decrease. This will decrease resistance across circuit 10, 14 and thus reduce the R.F. signal, since the current input from generator 15 is constant. Since the variations in R.F. signal are at an audio rate, the resistance of element 26 will also vary at an audio rate. Thus it can be seen that this novel feedback arrangement provides a simple and rugged method of obtaining a system that is substantially insensitive to gain variations at the fundamental frequency as well as the harmonics of the modulation.

At typical operating conditions magnet 13 may produce 2000 gausses, while coil 17 provides a triangular sweep at ½ cycle per minute of 0.5 gauss, while coil 19 provides a sinusoidal sweep at 30 cycles of 50 milligausses peak to peak. Oscillator 15, for proton resonance in the test sample, provides a constant current of 5 μa. at 8.52 mc. Coil 10 and capacitors 14, 27 and 28 provide a parallel impedance of 20,000 ohms, while amplifier-detector 20 and amplifier 21 provide a gain of 120 db. Resistor 25 may be 2000 ohms, while capacitors 27 and 28 are 15 μμf. and 1000 μμf., respectively. Resistor element 26 may be operated in the region of 170 ohms, which is equivalent to a resistance of 750,000 ohms across the tank circuit, so as not to load it appreciably.

Resistor element 26 may be any known resistor, the resistance of which varies directly as a function of current or voltage. In practice the so-called barretter, or temperature sensitive resistance has been found highly satisfactory for control as a function of current. Since the resistance will vary as the square of the current, it is desirable that amplifier 21 provide a relatively large D.C. biasing current so that the variations due to the detected modulation will be small. In particular, the Sperry barretter #821 has proved satisfactory, where the constant D.C. biasing current may be on the order of 7.5 ma. and the variations due to the detected modulation may be on the order of 0.5 ma.

While, as shown in FIG. 1, the controllable resistor element 26 may be connected in parallel with detecting coil 10, i.e., across the input to amplifier 20, the resistor element 26 may be connected in series with coil 10, i.e., in series with the input to amplifier 20, as shown in FIG. 2. Thus, as shown in FIG. 2, resistor 26 is in series with detecting coil 10B, and the direct current and low frequency current passing therethrough is blocked from coil 10B and amplifier 20 by blocking capacitors 29 and 30, respectively. The D.C. biasing current and the detected modulation fed back from amplifier 21 is applied to resistor element 26 through R.F. chokes 31 and 32.

In addition to absorption spectrometers of the type described in connection with FIG. 1, this novel feedback arrangement may be employed with the other types, such as those in which the coil 10 is connected in an R.F. bridge circuit, or those where coil 10 forms a portion of the R.F. oscillator tank circuit. Further, this feedback arrangement may be employed in connection with the so-called induction spectrometer as shown in FIG. 2, where the constant R.F. current is applied to a first coil 10A perpendicular to the unidirectional magnetic field through a sample 9, and the signal is detected in a second coil 10B perpendicular to both coil 10A and the unidirectional field. Also, where it is desired to detect the resonance curve directly, rather than its derivative, the modulation supplied by coil 19 is not applied, but nonetheless applicant's feedback arrangement will operate to maintain the R.F. input to amplifier 20 substantially constant.

Since audio amplifier 21 is preferably broad-band, the feedback arrangement will correct for variations in the harmonics of the modulation. Since detector 22 is frequency selective, only the fundamental need be measured, as shown in FIG. 1. If it is desired to detect a particular harmonic, detector 22 may be made sensitive to the desired harmonic by an appropriate reference signal, as is well-known.

Many modifications of the invention will occur to those skilled in the art. Accordingly the invention should not be limited by the representative embodiments described herein.

I claim:

1. In apparatus for detecting magnetic resonance phenomena in a sample of paramagnetic material, coil means adapted to provide a high frequency signal that varies in amplitude in accordance with said resonance phenomena, circuit means including said coil means coupled to means for amplifying said high frequency signal and for detecting said amplitude variations, means responsive to said detected amplitude variations for deriving a signal which is a function of the magnetic resonance properties of said material, and means responsive to the amplitude of said detected amplitude variations for maintaining the impedance of said circuit means substantially constant, whereby the high frequency signal input to said amplifying means is maintained substantially constant.

2. In apparatus for detecting magnetic resonance phenomena in a sample of paramagnetic material, coil means adapted to provide a high frequency signal that varies in amplitude in accordance with said resonance phenomena, means coupled to said coil means for amplifying said high frequency signal, means coupled to said amplifying means for detecting said amplitude variations, means responsive to said detected amplitude variations for deriving a signal which is a function of the magnetic resonance properties of said material, variable resistor means in circuit with said coil means, and negative feedback means coupled to said detecting means for varying the resistance of said resistor means as a function of the detected amplitude variations to compensate changes in the effective resistance of said coil means, whereby the high frequency signal input to said amplifying means is maintained substantially constant.

3. In apparatus for detecting magnetic resonance phenomena in a sample of paramagnetic material, coil means adapted to provide a high frequency signal that varies in amplitude in accordance with said resonance phenomena, means coupled to said coil means for amplifying said high frequency signal, means coupled to said amplifying means for detecting said amplitude variations, means responsive to said detected amplitude variations for deriving a signal which is a function of the magnetic resonance properties of said material, variable resistor means connected in parallel with said coil means, and means coupled to said detecting means for varying the resistance of said resistor means inversely with the detected amplitude variations to compensate changes in the effective resistance of said coil means, whereby the high frequency signal input to said amplifying means is maintained substantially constant.

4. In apparatus for detecting magnetic resonance phenomena in a sample of paramagnetic material, coil means adapted to provide a high frequency signal that varies in amplitude in accordance with said resonance phenomena, means coupled to said coil means for amplifying said high frequency signal, means coupled to said amplifying means for detecting said amplitude variations, means responsive to said detected amplitude variations for deriving a signal which is a function of the magnetic resonance properties of said material, variable resistor means connected in series with said coil means, and means coupled to said detecting means for varying the resistance of said resistor means inversely with the detected amplitude variations to compensate changes in the effective resistance of said coil means, whereby the high frequency signal input to said amplifying means is maintained substantially constant.

5. In apparatus for detecting magnetic resonance phenomena in a sample of paramagnetic material, coil means adapted to provide a high frequency signal that is amplitude modulated in accordance with said resonance phenomena, means coupled to said coil means for amplifying said high frequency signal, means coupled to said amplifying means for detecting said modulation, means responsive to said detected modulation for deriving a signal which is a function of the magnetic resonance properties of said material, controllable resistor means connected in parallel with said coil means, the resistance of said resistor means varying directly as a function of the current passing therethrough, and means coupled to the output of said detecting means for applying current through said resistor means substantially 180° out of phase with said modulation to compensate changes in the effective resistance of said coil means, whereby the high frequency signal input to said amplifying means is maintained substantially constant.

6. Apparatus for observing magnetic resonance phenomena comprising means for generating a unidirectional magnetic field, means for modulating said field at a low frequency, coil means disposed perpendicularly to said unidirectional field, means for applying a substantially constant current, high frequency signal to said coil means, means coupled to said coil means for amplifying said high frequency signal, means coupled to said amplifying means for detecting any amplitude modulation thereof at said low frequency, controllable resistor means connected in circuit with said coil means, the resistance of said resistor means varying directly as a function of the current passing therethrough, means coupled to the output of said detector means for applying current through said resistor means substantially 180° out of phase with said modulation to compensate changes in the effective resistance of said coil means, whereby the high frequency signal input to said amplifying means is maintained substantially constant, and means for measuring the variations in current through said resistor means at said low frequency to provide an indication of said magnetic resonance phenomena.

7. Apparatus for observing magnetic resonance phenomena comprising means for generating a unidirectional magnetic field, means for modulating said field at a low frequency, first coil means disposed perpendicularly to said unidirectional field, means for applying a substantially constant current high frequency signal to said first coil means, second coil means disposed perpendicularly to said unidirectional field and to said first coil means, means coupled to said second coil means for amplifying said high frequency signal and for detecting any amplitude modulation thereof at said low frequency, controllable resistor means connected in circuit with said second coil means, the resistance of said resistor means varying directly as a function of the current passing therethrough, means coupled to the output of said detector means for applying current through said resistor means substantially 180° out of phase with said modulation to compensate changes in the effective resistance of said second coil means, whereby the high frequency signal input to said amplifying means is maintained substantially constant, and means for measuring the variations in current through said resistor means at said low frequency to provide an indication of said magnetic resonance phenomena.

8. In combination with means for amplifying high frequency signals and for detecting the amplitude variations thereof, including input means and output means, means for deriving from said output means a signal representative of said detected amplitude variations, a negative feedback circuit comprising resistor means coupled to said input means, the resistance of said resistor means being a direct function of the current passing therethrough, and means for passing current through said resistor means as a function of the detected amplitude variations at said output means, whereby said high frequency signal at said input means is maintained substantially constant.

9. In combination with means for amplifying high frequency signals and for detecting the amplitude variations thereof, including input means and output means, means for deriving from said output means a signal representative of said detected amplitude variations, a negative feedback circuit comprising resistor means coupled to said input means, the resistance of said resistor means varying proportionally to the temperature thereof and thus proportionally to the square of the current passing therethrough, means for passing a constant direct current through said resistor means at an amplitude substantially greater than the amplitude of said detected amplitude variations, and means for passing current through said resistor means inversely proportional to the detected amplitude variations at said output means, whereby said high frequency signal at said input means is maintained substantially constant.

10. In combination with means for amplifying high frequency signals and for detecting the amplitude variations thereof, including input means and output means, a negative feedback circuit comprising variable resistor means connected across said input means, the resistance of said resistor means varying directly with the current passing therethrough, and means including a decoupling impedance for passing current through said resistor means inversely with the detected amplitude variations at said output means, whereby said high frequency signal at said input means is maintained substantially constant.

11. In combination with means for amplifying high frequency signals and for detecting the amplitude variations thereof, including input means and output means, a negative feedback circuit comprising variable resistor means capacitively coupled in series with said input means, the resistance of said resistor means varying directly with the current passing therethrough, and means for passing current through said resistor means inversely with the detected amplitude variations at said output means, whereby said high frequency signal at said input means is maintained substantially constant.

12. In combination with means for amplifying high frequency signals and for detecting the amplitude modulation thereof, including input coil means having a predetermined impedance and output means, a negative feedback circuit comprising resistor means and capacitive attenuator means for coupling said resistor means in parallel with the impedance of said input means, the resistance of said resistor means varying directly with the current passing therethrough, and means including decoupling impedance means connected to said output means for passing current through said resistor means proportional to said modulation but 180° out of phase therewith, whereby the total resistive impedance of said input coil means and resistor means is maintained substantially constant.

13. In apparatus for detecting magnetic resonance phenomena in a sample of paramagnetic material, coil means adapted to provide a high frequency signal that varies in amplitude in accordance with said resonance phenomena, parallel tuned circuit means including said coil means coupled to means for amplifying said high frequency signal and for detecting said amplitude variations, means responsive to said detected amplitude variations for deriving a signal which is a function of the magnetic resonance properties of said material, and means responsive to the amplitude of said detected amplitude variations for maintaining the effective series resistance of said parallel tuned circuit means substantially constant, whereby the amplitude of the high frequency signal input to said feedback means is maintained substantially constant.

References Cited in the file of this patent

UNITED STATES PATENTS

| | | |
|---|---|---|
| 2,084,135 | Ford | June 15, 1937 |
| 2,111,589 | Holst | Mar. 22, 1938 |
| 2,179,928 | Hagenhaus | Nov. 14, 1939 |
| 2,204,962 | Hildebrandt | June 18, 1940 |
| 2,271,208 | Sauer | Jan. 27, 1942 |
| 2,290,084 | Albright | July 14, 1942 |
| 2,538,772 | Ferrill | Jan. 23, 1951 |
| 2,772,391 | Mackey | Nov. 27, 1956 |

FOREIGN PATENTS

| | | |
|---|---|---|
| 664,644 | Great Britain | Jan. 19, 1952 |

OTHER REFERENCES

Thomas et al.: Journal of Research of National Bureau of Standards, vol. 44, pp. 569–583 (June 1950), pp. 572–3 relied on.

Andrew: Nuclear Magnetic Resonance, Cambridge University Press, 1955, p. 57 relied on, and pages 35–46.